United States Patent [19]

Ihara

[11] Patent Number: 5,579,391
[45] Date of Patent: Nov. 26, 1996

[54] TV SCRAMBLE SYSTEM FOR PREVENTING ILLEGAL RECEPTION

[75] Inventor: Kiichi Ihara, Kanagawa, Japan

[73] Assignee: Sony Corporation, Tokyo, Japan

[21] Appl. No.: 434,315

[22] Filed: May 2, 1995

Related U.S. Application Data

[63] Continuation of Ser. No. 132,875, Oct. 7, 1993, abandoned.

[30] Foreign Application Priority Data

Oct. 9, 1992 [JP] Japan .................................. 4-271810

[51] Int. Cl.$^6$ .................................................. H04N 7/167
[52] U.S. Cl. ............................... 380/15; 380/10; 380/16; 380/20; 348/4; 360/60
[58] Field of Search ................................ 380/10, 15, 16, 380/19, 20; 348/4, 5.5; 360/60

[56] References Cited

U.S. PATENT DOCUMENTS

| | | | |
|---|---|---|---|
| 4,914,694 | 4/1990 | Leonard et al. | 380/5 |
| 4,919,536 | 4/1990 | Komine | 356/28.5 |
| 5,333,044 | 7/1994 | Scaffer | 356/28 |
| 5,345,505 | 9/1994 | Pires | 380/20 |

FOREIGN PATENT DOCUMENTS

| | | | |
|---|---|---|---|
| 0267039 | 5/1988 | European Pat. Off. | H04N 5/91 |
| 0338866 | 10/1989 | European Pat. Off. | H04N 5/91 |
| 2180111 | 3/1987 | United Kingdom | H04H 9/00 |
| 8201273 | 4/1982 | WIPO | G11B 23/28 |

OTHER PUBLICATIONS

H. Meng and F. Hussain, Holographic Particle Velocimetry; a 3-D Measurement Technique for Vortex Interactions, Coherent Structures and Turbulence, Fluid Dyn. Res.

P. H. Malyak and B. J. Thompson, "Particle displacement and velocity measurement using holography" Optical Engineering, Sep./Oct. 1984/ vol. 23 No. 5 pp. 567–576.

C. E. Willert and M. Gharib, "Digital particle image velocimetry" Expirements in Fluids 10, 181–193 (1991) in Liquids by Digital 3–D Image Processing of Hologram Reconstructions, Appl. Opt., 19 pp. 3529–3535, (1980).

P. J. Bryanston–Cross, C. Quan, M. Funes–Gallanzi, and T. R. Judge, Quantitive Analysis of Holographic Paricle Data, Opt. and Lasers in Eng., 18,267–279 (1994).

L. M. Weinstein, G. B. Beeler, and M. Lindermann, "High–Speed Holocinematographic Velocimeter for Studying Turbulent Flow Control Physics", AIAA Paper 85–0526, 1985.

G. Haussmann and W. Lauterborn, "Determination of Size and Position of Fast Moving Gas Bubbles".

*Primary Examiner*—David C. Cain
*Attorney, Agent, or Firm*—Jay H. Maioli

[57] ABSTRACT

A scramble system can effectively prevent a scrambled broadcast from being viewed illegally. In a scramble system in which a video signal scrambled by a scrambling apparatus (10) is descrambled by a decoding apparatus (20), an identification code that specifies the decoding apparatus (20) is inserted into a vertical blanking period of the video signal supplied to the decoding apparatus (20).

9 Claims, 4 Drawing Sheets

5,579,391

TV SCRAMBLE SYSTEM FOR PREVENTING ILLEGAL RECEPTION

This is a continuation of application Ser. No. 08/132,875, filed Oct. 7, 1993 abandoned.

BACKGROUND OF THE INVENTION

1. Field of the Invention

The present invention relates to a scramble system for use in a television broadcast signal transmitted in the form of a scrambled signal.

2. Description of the Related Art

In television broadcasting, there is now commercially available a scrambled broadcasting by which only particular reception contract viewer is permitted to enjoy a video program. In this scrambled broadcasting, as a television broadcast signal transmitted from a broadcasting station, for example, there is used a signal that is scrambled such that a normal picture cannot be reproduced by an ordinary television receiver. Then, a decoding apparatus for descrambling the scrambled broadcasting wave is distributed to only contractors who pay charges according to a predetermined method. The viewer can then enjoy normal picture and sound by connecting the decoding apparatus to the receiving apparatus.

However, in the pay channel television broadcasting carried out by the scrambled broadcasting system, it is frequently observed that a video program is illegally enjoyed by the viewer by abusing the decoding apparatus. In the ordinary pay channel broadcasting, the contractor is permitted to view only the received television broadcasting by the television receiver or only to record such television broadcasting by a viewer's VTR. Accordingly, it is illegal that a video tape in which the received television broadcasting is recorded is distributed or a television broadcasting is received outside the contracted service area. Further, it is also illegal that the television broadcasting is viewed at a place where many people can watch television broadcasting such as a hotel or the like although the viewer made the contract for only personal use in the home.

According to the conventional scrambled broadcasting, if the decoding apparatus is so effective, then it is impossible to avoid the illegal viewer. For example, even when a pirated video tape in which the scrambled broadcasting is descrambled recorded is distributed in the market, it is impossible to specify the decoding apparatus from such pirated video tape.

OBJECTS AND SUMMARY OF THE INVENTION

Therefore, it is an object of the present invention to provide an improved scramble system in which the aforesaid shortcomings and disadvantages of the prior art can be eliminated.

More specifically, it is an object of the present invention to provide a scramble system in which a scrambled broadcasting can be prevented from being viewed illegally.

It is another object of the present invention to provide a scramble system in which the viewer can watch a video program satisfactorily even when an identification code is inserted into a video signal.

It is a further object of the present invention to provide a scramble system in which a video transmission side can be specified.

According to an aspect of the present invention, there is provided a scramble system which comprises a program transmitting apparatus for outputting a video program and ancillary information concerning the video program, a scrambling apparatus for inserting the ancillary information into a vertical blanking period of a video signal transmitted from the program transmitting apparatus and scrambling the video signal together with an audio signal, a transmitting apparatus for transmitting a signal supplied from the scrambling apparatus as a broadcast wave, a receiving apparatus for receiving and demodulating the broadcast wave transmitted from the transmitting apparatus, a decoding apparatus for inserting an identification code of each of the decoding apparatus into a vertical blanking period of a video signal demodulated from the receiving apparatus, and a video equipment to which a signal from the decoding apparatus is supplied.

BRIEF DESCRIPTION OF THE DRAWINGS

A better understanding of other objects, features, and advantages of the present invention can be gained from a consideration of the following detailed description of illustrative embodiments thereof, in conjunction with the accompanying drawings, in which.

DETAILED DESCRIPTION OF THE PREFERRED EMBODIMENTS

The present invention will now be described with reference to the drawings.

Figure 1:
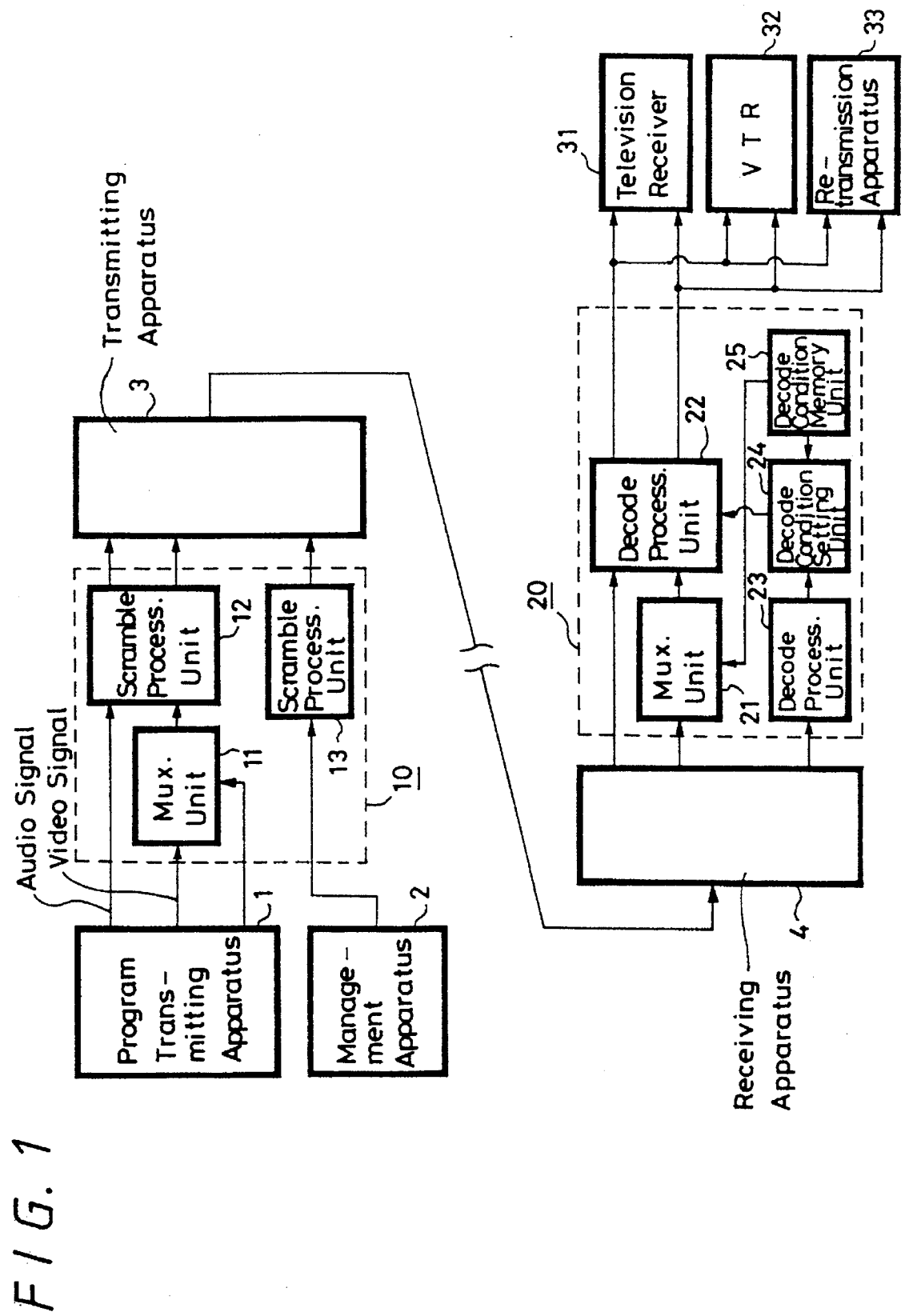
FIG. 1 is a block diagram showing a circuit arrangement of a scramble system according to a first embodiment of the present invention.

As shown in FIG. 1 of the accompanying drawings which shows a first embodiment of the present invention, there is provided a program transmitting apparatus 1 from which there are transmitted a variety of video programs as a video signal and an audio signal. Simultaneously, the program transmitting apparatus 1 transmits ancillary information concerning a video program now transmitted, such as identification information for identifying a video program transmitting source, description of the contents of soft and a transmission date, etc. As the ancillary information, there is used data that is coded by a predetermined method.

Figure 2:
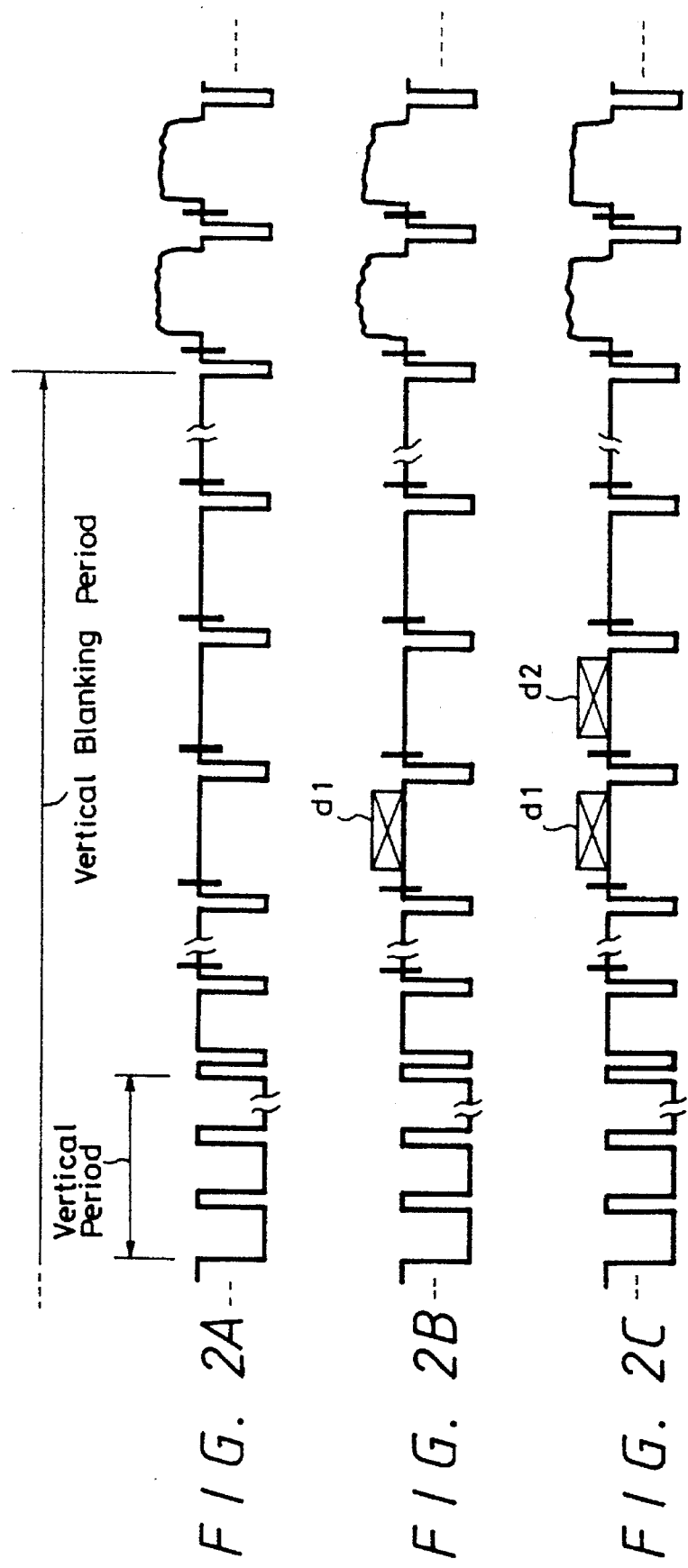
FIGS. 2A to 2C are diagrams of waveforms of a video signal according to the first embodiment of the present invention and showing the condition that ancillary information and an identification code are superimposed upon the video signal, respectively.

The video signal, the audio signal and the ancillary information transmitted from the program transmitting apparatus 1 are supplied to a scrambling apparatus 10. In the scrambling apparatus 10, the video signal and the soft information supplied thereto from the program transmitting apparatus 1 are supplied to a multiplexing (MUX.) unit 11, in which a coded ancillary information is inserted into a predetermined one horizontal line within the vertical blanking period of the video signal. More specifically, let it be assumed that a video signal having a vertical blanking period as shown in FIG. 2A, for example, is output from the program transmitting apparatus 1. Then, at that time, ancillary information d1 is superimposed upon a predetermined horizontal line within the vertical blanking period as shown in FIG. 2B. The horizontal line on which the ancillary information d1 is superimposed is located outside of a vertical synchronizing (sync.) period so that the horizontal line cannot affect the vertical sync. processing.

The video signal output from the multiplexing unit 11 within the scrambling apparatus 10 and the audio signal supplied from the program transmitting apparatus 1 are supplied to a scramble processing unit 12, in which the video signal and the audio signal are processed in a predetermined scramble processing fashion. In the scramble processing, the video signal, for example, is scrambled by a line-rotation system or line-permutation system. The audio signal is scrambled by an addition of pseudo-random sequence (in the case of a digital audio signal). Video and audio signals thus scrambled are supplied to a transmitting apparatus 3 from the scrambling apparatus 10.

The transmitting apparatus 3 multiplexes the audio signal and management information supplied thereto and transmits the multiplexed audio signal and management information and the video signal according to a predetermined transmission method. When a satellite broadcast is carried out by utilizing a broadcast satellite, for example, the multiplexed audio signal and management information and the video signal are modulated to a satellite broadcast transmission channel signal and then transmitted to the broadcast satellite.

A circuit arrangement of a receiving side that receives the television broadcast thus transmitted will be described next.

As shown in FIG. 1, there is provided a receiving apparatus 4 that receives a broadcast wave, i.e., a television broadcast wave transmitted from the transmitting apparatus 3. When a satellite broadcast signal, for example, is received, the receiving apparatus 4 demodulates a broadcast wave received at a parabolic antenna (not shown) to provide baseband video and audio signals and also extracts management information multiplexed on the audio signal. The receiving apparatus 4 supplies the video and audio signals thus demodulated to a decoding apparatus 20. In this embodiment, the video signal supplied to the decoding apparatus 20 is supplied to a multiplexing unit 21, in which an identification code is inserted into a predetermined one horizontal line within the vertical blanking period of the video signal, i.e., an identification code d2 is superimposed upon a predetermined horizontal line within the vertical blanking period of the video signal as shown in FIG. 2C. This identification code d2 might be a code of an individual number assigned to each of decoding apparatus. The individual number code information is stored in a decoding condition memory unit 25 and the individual number code information stored in the decoding condition memory unit 25 is supplied to the multiplexing unit 21. The horizontal line upon which the identification code d2 is superimposed is made adjacent to the horizontal line upon which the ancillary information d1 is superimposed and is prevented from affecting the vertical synchronizing processing.

The video signal on which the identification code d2 is superimposed by the multiplexing unit 21 and the audio signal received by the receiving apparatus 4 are supplied to a decode processing unit 22 in which the descramble processing for descrambling the scramble is carried out. The descramble processing in this case is executed when information becomes coincident with the decoding condition. More specifically, the management information received by the receiving apparatus 4 is supplied to a decode processing unit 23, in which it is descrambled. The management information thus descrambled is supplied to a decoding condition setting unit 24. The decoding condition setting unit 24 obtains information concerning the decoding condition set in the decoding apparatus 20 from the decoding condition memory unit 25 and determines whether or not management information contained in the received broadcast wave is coincident with the decoding condition set in the decoding apparatus 20. If the management information is coincident with the decoding condition, then the descrambling processing in the decode processing unit 22 is permitted.

The video and audio signals thus descrambled by the decode processing unit 22 are output from the decoding apparatus 20. The video and audio signals output from the decoding apparatus 20 are supplied to a video equipment. When a television receiver 31 and a video tape recorder (VTR) 32 are installed, the video and audio signals are supplied to the television receiver 31 and the VTR 32, respectively. If the receiving side is community receiving facilities of relatively small scale, then the video and audio signals output from the decoding apparatus 20 are supplied to a retransmission apparatus 33 and then retransmitted from the retransmission apparatus 33 via a wire system or wireless system, thereby being received at a plurality of television receivers (terminal apparatus 36).

Figure 3:
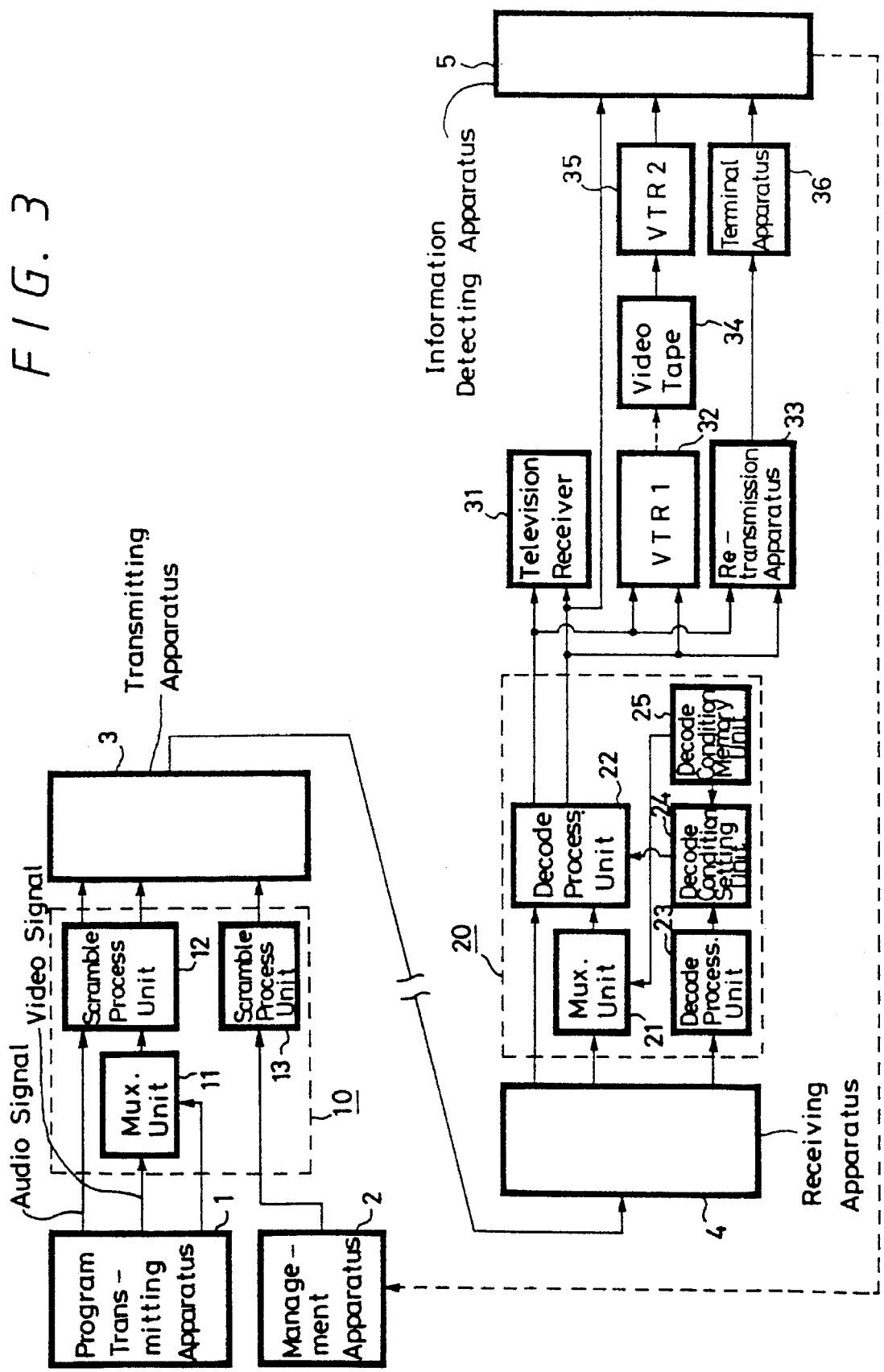
FIG. 3 is a block diagram showing a circuit arrangement of the scramble system according to a second embodiment of the present invention.

FIG. 3 shows a second embodiment of the scramble system according to the present invention. In FIG. 3, like parts corresponding to those of FIG. 1 are marked with the same references and therefore need not be described in detail.

In this embodiment shown in FIG. 3, the processing required by the broadcasting station side to manage the viewer contract is executed by a management apparatus 2 formed of a computer. The management apparatus 2 supplies the scrambling apparatus 10 with information required to manage each terminal equipment (decoding apparatus). A scramble processing unit 13 provided within the scrambling apparatus 10 scrambles the information necessary for the management and supplies the management information thus scrambled to the transmitting apparatus 3.

In the second embodiment of the present invention, as shown in FIG. 3, an information detecting apparatus 5 is prepared by the management side that manages the television broadcast reception contract. The information detecting apparatus 5 detects the identification code d2 and the ancillary information d1 inserted into the predetermined horizontal lines in the vertical blanking period of the video signal. When it is determined that there is an illegal viewer, a video signal output from the decoding apparatus 20 that the illegal viewer has is supplied to the information detecting apparatus 5 which then detects the identification code.

The identification code is detected by the information detecting apparatus 20 as described above, whereby the viewer who makes the reception contract to utilize the decoding apparatus to which the detected identification code number is assigned can be judged by the management side. Then, if management information that inhibits the decoding apparatus of the illegal viewer from effecting the descrambling is multiplexed on the broadcast wave and then transmitted, then the decoding apparatus of the illegal viewer is inhibited from executing the descramble processing. Therefore, the illegal viewer cannot watch the pay television broadcast. Alternatively, it is possible to warn the illegal viewer having the decoding apparatus by some proper means.

According to this embodiment, the aforesaid control operation can be carried out. Therefore, let it be assumed that there is a pay channel television broadcast that the viewers can make reception contract within a certain service area, for example. Also, let it be assumed that a hotel outside the service area (or hotel within the service area and which is not permitted to receive the pay channel television broadcast) gives its service to guests so that such pay channel television broadcast received is descrambled by the decoding apparatus and can be received by the television receiver in each guest room. At that time, a video signal supplied to the television receiver in any quest room is supplied to the information detecting apparatus 5 to thereby judge the decoding apparatus thus utilized to descramble the pay channel television broadcast. Thus, the decoding apparatus that is illegally utilized can be specified with ease by the information detecting apparatus 5 when it is set in the doubtful place where illegal reception is assumed to be carried out. In this case, because the identification code is inserted into the vertical blanking period, ordinary received picture and received sound are not changed at all and the viewer can enjoy the pay channel television broadcasting without trouble.

When there is a so-called pirated video program that is formed from a video tape 34 in which a television broadcast received by the reception system of this embodiment is recorded by the VTR1 32, such pirated video program is bought, reproduced by a VTR2 35 and then an identification code inserted into the vertical blanking period of the reproduced video signal is detected by the information detecting apparatus 5, whereby the decoding apparatus that was utilized in making the pirated video program can be determined. In this case, when the video program is transmitted, by detecting the ancillary information inserted into the vertical blanking period by the information detecting apparatus 5 in the scrambling apparatus 10 side, it is convenient that time and date of television broadcasting that makes the pirated video program can be determined.

While the identification code is inserted into one horizontal line as described above, the present invention is not limited thereto and the identification code may be inserted over a plurality of horizontal lines. Further, such a variant is also possible that a set of identification codes can be detected by a combination of data inserted into horizontal lines of the vertical blanking periods of a plurality of fields. Furthermore, the identification code may not be inserted into each field but may be cyclically inserted into every plural fields.

Figure 4:
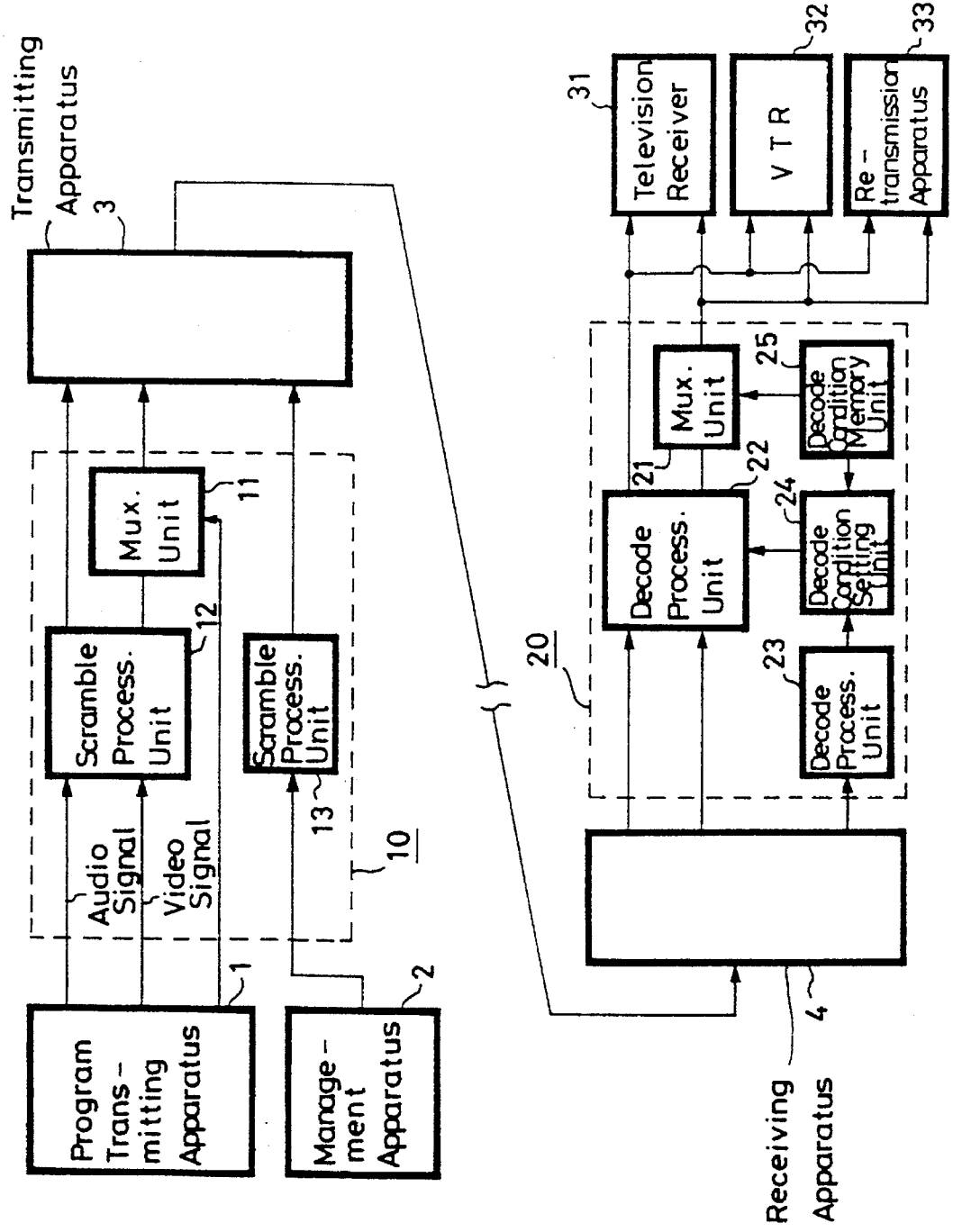
FIG. 4 is a block diagram showing a circuit arrangement of the scramble system according to a third embodiment of the present invention.

While the identification code is inserted before the descramble processing is executed by the decode processing unit 22 of the decoding apparatus 20, the present invention is not limited thereto and such a variant as shown in FIG. 4 is also possible. That is, FIG. 4 shows a third embodiment of the present invention. As shown in FIG. 4, the identification code may be inserted into the video signal processed by the decode processing unit 22. Further, the ancillary information may be inserted into the video signal in the scrambling apparatus 10 after the scrambling processing was executed. Because the video signal in the vertical blanking period is not scrambled in the ordinary scramble processing, the inserted condition of the identification code is not affected.

The ancillary information concerning the video program now being transmitted is inserted into the video signal by a processing similar to that of the identification code in the scrambling apparatus 10 as described above so that the contents of the video program being transmitted can automatically be detected on the receiving side by detecting the ancillary information on the reception side.

According to the present invention, the decoding apparatus utilized can be specified by detecting the identification code inserted into the video signal when the video and audio signals are descrambled by the decoding apparatus. Therefore, when there is an illegal viewer, the decoding apparatus used by the illegal viewer can be detected. In this case, since the identification code is inserted into the vertical blanking period, general users cannot know the identification code at all and the insertion of the identification code cannot hinder the legal viewers from watching the video program satisfactorily.

Further, because the code concerning the ancillary information is inserted into the video signal, the ancillary information also can be detected when the identification code is detected. Therefore, if a video program in which a scrambled broadcasting is recorded, for example, is commercially available on the market, the ancillary information is detected from the video program together with the identification code, thereby making it possible to specify a video transmission side.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A scramble system comprising:
    a program transmitting apparatus for outputting a video program and ancillary information concerning said video program;
    a scrambling apparatus for inserting said ancillary information into a vertical blanking period of a video signal transmitted from said program transmitting apparatus and scrambling said video signal together with an audio signal;
    a transmitting apparatus for transmitting a scrambled signal supplied from said scrambling apparatus as a broadcast wave;
    a receiving apparatus for receiving and demodulating said broadcast wave transmitted from said transmitting apparatus;
    a decoding apparatus for inserting an identification code of each of said decoding apparatus into a vertical blanking period of a video signal demodulated by said receiving apparatus, said decoding apparatus comprising a decode condition memory unit, a decode processing unit, and a decode condition setting unit, said decode condition setting unit being responsive to detection of a predetermined relation between a signal generated locally within said decoding apparatus by said decode condition memory unit and a portion of said broadcast wave for generating a signal enabling said decode processing unit to unscramble said demodulated video signal; and
    a video equipment to which a signal from said decoding apparatus is supplied.

2. The scramble system according to claim 1 wherein said scrambling apparatus superimposes said ancillary information upon a predetermined one horizontal line within a vertical blanking period of said video signal supplied from said program transmitting apparatus.

3. The scramble system according to claim 1 wherein said decoding apparatus superimposes an identification code of each of said decoding apparatus upon a predetermined one horizontal line within the vertical blanking period of said video signal.

4. The scramble system according to claim 1 further comprising an information detecting apparatus for detecting said identification code or said ancillary information inserted into said predetermined line within the vertical blanking period of said video signal.

5. The scramble system according to claim 1 further comprising a management apparatus for supplying said scrambling apparatus with information necessary for managing each of said decoding apparatus.

6. The scramble system according to claim 1 further comprising a management apparatus for supplying said scrambling apparatus with information necessary for managing each of said decoding apparatus and a scrambling apparatus for scrambling information necessary for managing each of said decoding apparatus supplied thereto and supplying the scrambled management information to said transmitting apparatus.

7. The scramble system according to claim 1 wherein said ancillary information contains an identification code for identifying the video program transmission side.

8. The scramble system according to claim 1 wherein said ancillary information contains a description of the contents of the video program.

9. The scramble system according to claim 1 wherein said ancillary information contains a video program transmission time and date.

* * * * *